(12) United States Patent
Khosrowpour

(10) Patent No.: US 6,721,817 B1
(45) Date of Patent: *Apr. 13, 2004

(54) ORIGINAL EQUIPMENT MANUFACTURER IDENTIFICATION FOR CONFIGURABLE ELECTRONIC HARDWARE

(75) Inventor: Farzad Khosrowpour, Longmont, CO (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,007

(22) Filed: Jan. 21, 1997

(51) Int. Cl.⁷ ............................................... G06F 13/14
(52) U.S. Cl. ........................................... 710/8; 710/305
(58) Field of Search ............................. 395/681, 651, 395/652, 653, 828, 701, 129, 500; 711/100; 340/825.31; 345/326, 302, 333, 348; 365/233, 189.305, 225.7

(56) References Cited

U.S. PATENT DOCUMENTS

| | | | | |
|---|---|---|---|---|
| 4,943,804 A | * | 7/1990 | Lee et al. | 340/825.31 |
| 5,274,791 A | * | 12/1993 | Bracking et al. | 395/425 |
| 5,543,727 A | * | 8/1996 | Bushard et al. | 324/760 |
| 5,640,562 A | * | 6/1997 | Wold et al. | 395/652 |
| 5,696,701 A | * | 12/1997 | Burgess et al. | 364/551.01 |
| 5,742,844 A | * | 4/1998 | Feldman | 395/800 |
| 5,748,980 A | * | 5/1998 | Lipe et al. | 395/828 |
| 5,758,071 A | * | 5/1998 | Burgess et al. | 395/200.5 |
| 5,826,090 A | * | 10/1998 | Mealey et al. | 395/712 |
| 5,903,410 A | * | 5/1999 | Blaum et al. | 360/77.08 |
| 5,903,894 A | * | 5/1999 | Reneris | 707/100 |

OTHER PUBLICATIONS

"Structured Computer Organization" 3rd Edition, 1990 by Andrew S. Tanenbaum*

* cited by examiner

*Primary Examiner*—Peter Wong
*Assistant Examiner*—Tim Vo
(74) *Attorney, Agent, or Firm*—Hamilton & Terrile, LLP; Stephen A. Terrile

(57) ABSTRACT

A configurable hardware for coupling to one of a plurality of hardware. Each of the plurality of hardware has a type. The configurable hardware includes a memory for storing an ID. The ID identifies the type of the hardware coupled to the configurable hardware.

29 Claims, 4 Drawing Sheets

100

ORIGINAL EQUIPMENT MANUFACTURER IDENTIFICATION FOR CONFIGURABLE ELECTRONIC HARDWARE

BACKGROUND OF THE INVENTION

1. Field of the Invention

This invention relates to electronic hardware and, more particularly, to configurable electronic hardware for use by original equipment manufacturers (OEMs) in manufacturing computer systems.

2. Description of the Related Art

Computer systems are information handling systems which can be designed to give independent computing power to single or multiple users. In its simplest form, a computer system is an electronic calculating machine that typically accepts digitized input information, processes it according to a program (a list of internally stored instructions), and produces the resultant output information. A computer system may be described as having five functional parts: input, memory, arithmetic and logic, output, and control. Traditionally, the arithmetic and logic circuits and the control unit are referred to collectively as the central processing unit (CPU) or simply as the processor. Also, input and output equipment are often combined so that such equipment is referred to collectively as input/output (I/O) devices. Computer systems typically include several I/O devices. For example, a computer system can include such I/O devices as a keyboard, a mouse, mass storage devices (e.g., floppy or fixed disk drives, CD-ROM drives and tape drives), a modem, a digital communication device, a video display, audio speakers and a printer.

Computer systems have attained widespread use for providing computer power to many segments of modern society. Consequently, computer systems may be found in many forms including mainframes, minicomputers, workstations, file servers, embedded systems and personal computer systems. A personal computer system, such as the International Business Machines (IBM) compatible personal computer system, can usually be defined as a desk top, floor standing, or portable microcomputer that includes a system unit having a system processor with associated volatile and nonvolatile memory, and various I/O devices. One of the distinguishing characteristics of these systems is the use of a system board to electrically connect these components together.

Computer systems are often marketed by original equipment manufacturers (OEMs). An OEM may manufacture a computer system itself, contract or subcontract another company to do the manufacturing, or buy parts or whole computer systems manufactured by others. One example of a part that is often manufactured by another for incorporation into the OEM's computer system is the system board of the computer system.

Because different OEMs often use identical system boards in their computer systems, a problem arises when different OEMs have different requirements for interaction of the system board with the rest of the computer system. For example, some OEMs may require a signal to have one polarity (e.g., active high), but others may require the same signal to have another polarity (e.g., active low). Another example is some OEMs monitor fan speed by revolutions per minute (RPMs), whereas others use an on/off status bit. Other examples of variables that require proper configuration include BIOS (basic input/output system) interaction at boot time with the hardware, external enclosure connectivity, fan connectivity, power supply polarity control and remote sensing, remote reset and power cycling connectivity, and thermal and voltage measurement.

Accordingly, system boards must be properly configured for interaction with the rest of the computer system. One method of configuring system boards is to use jumpers and switches to set certain parameters. In some systems, one or two banks of DIP (dual in-line package) switches could code the differences between systems. In the case of BIOS interaction with the hardware at power-up, for example, the processor could read the switch positions to determine the configuration required (e.g., which drives are installed and how much main memory is available).

However, passive jumpers become less practical as the total number of required options exceeds three or four possibilities. As the number of options for computer configuration increases, a reasonable number of switches cannot allow for the number of computer configurations required. In addition, there are other problems with such switches. For instance, switch contacts naturally fail and may even be shorted by computer system users. (Users sometimes set switches using pencils, the graphite of which is conductive and can scrape off and short out the switches). Additionally, the switches are often hidden by expansion adapter cards and are difficult to access to make new settings. Furthermore, jumpers and switches are often improperly set at the customer site, creating unnecessary problems for customer support organizations.

To solve these problems, systems have been developed that utilize a small block of battery-backed CMOS RAM (complementary metal-oxide semiconductor random access memory) or, in the alternative, a form of nonvolatile random access memory (NVRAM) such as flash RAM or an EEPROM (electrically erasable programmable read-only memory) to store necessary system configuration parameters. An early example of such a system using CMOS RAM for BIOS access is the IBM PC/AT which uses the Motorola MC146818 chip. The ROM BIOS reads the CMOS RAM during the boot process to determine the proper system configuration. However, similar to the use of jumpers, this architectural implementation does not allow for low level configurable hardware.

Active hardware identifiers (IDs) have also been implemented. For instance, the IBM PS/2 computer system uses microchannel architecture (MCA) that allows automatic identification of an MCA adapter coupled to the MCA bus. Every adapter is assigned a two-byte identification number which is read and analyzed by the computer system. Third-party manufacturers also obtain an identification number for their MCA products; the assignment of these identification numbers is controlled by IBM. These IDs are stored in extended CMOS RAM, but could also be stored in a flash memory or an EEPROM. All MCA adapters and MCA system boards contain programmable option select (POS) registers which hold the two-byte identification number, four option bytes for the adapter manufacturer to configure the inserted adapter (fulfilling the function of the former DIP switches), and two sub-address extension bytes to provide access to an additional configuration register if needed by the manufacturer. Another example in which active hardware identifiers are stored in extended CMOS RAM is the bus architecture provided by Extended Industrial Standard Architecture (EISA).

During the boot process, the POST (power-on self test) routine of the BIOS reads the adapter ID and compares it with the configuration data which is held in the CMOS RAM. However, these IDs can not be utilized for the power-on state as they are normally powered off. Specifically, two modes of operation are allowed: the active mode and the setup mode. During the setup mode, only the POS registers are accessible, not the ordinary control registers. During the active mode (normal operation), the POS registers are not accessible; only the ordinary control registers are accessible. These IDs are effectively turned off during normal operation. Also, the system must be powered up for the CMOS to be read.

Thus, a need is demonstrated for configurable hardware so that the differing needs of various OEMs may be satisfied by identical system boards.

SUMMARY OF THE INVENTION

It has been discovered that configurable hardware may be implemented on a system board by providing an OEM ID to allow different customers to configure the system board as needed. Such a device advantageously allows different OEMs to utilize identical system boards without the need to change their value-added hardware and software. Additionally, the use of an OEM ID eliminates the need for jumpers and the problems associated therewith.

In one embodiment of the invention, a configurable hardware is for coupling to one of a plurality of hardware. Each of the plurality of hardware has a type. The configurable hardware includes a memory for storing an ID. The ID identifies the type of the hardware coupled to the configurable hardware.

In another embodiment, a computer system includes a first hardware and a second hardware. The first hardware is used by an OEM. The second hardware is for coupling to the first hardware. The second hardware includes a memory and a configuration circuit. The memory stores an ID identifying a configuration used by the OEM. The configuration circuit receives the ID identifying configuration used by the OEM. The configuration circuit decodes the ID to configure signals on the second hardware.

In another embodiment, a method for providing configurable hardware in a computer system includes providing a memory and providing configuration logic. The memory is powered by standby power. The memory stores an ID identifying an OEM configuration. The configuration logic is also powered by standby power. The configuration logic receives the OEM ID and signal of the computer system. The configuration logic configures the signals of the computer system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims which follow.

A unique identifier is assigned to each configuration required by each manufacturer (OEM) of computer systems. The unique identifier is stored in an OEM ID circuit. The identifier is used by configuration circuitry to configure the system board for compatibility with the OEM's added hardware and to ensure continuity of operation of the OEM's hardware. Because the OEM ID is used to identify the optional configuration required, no jumpers or active hardware IDs are required.

Figure 1:
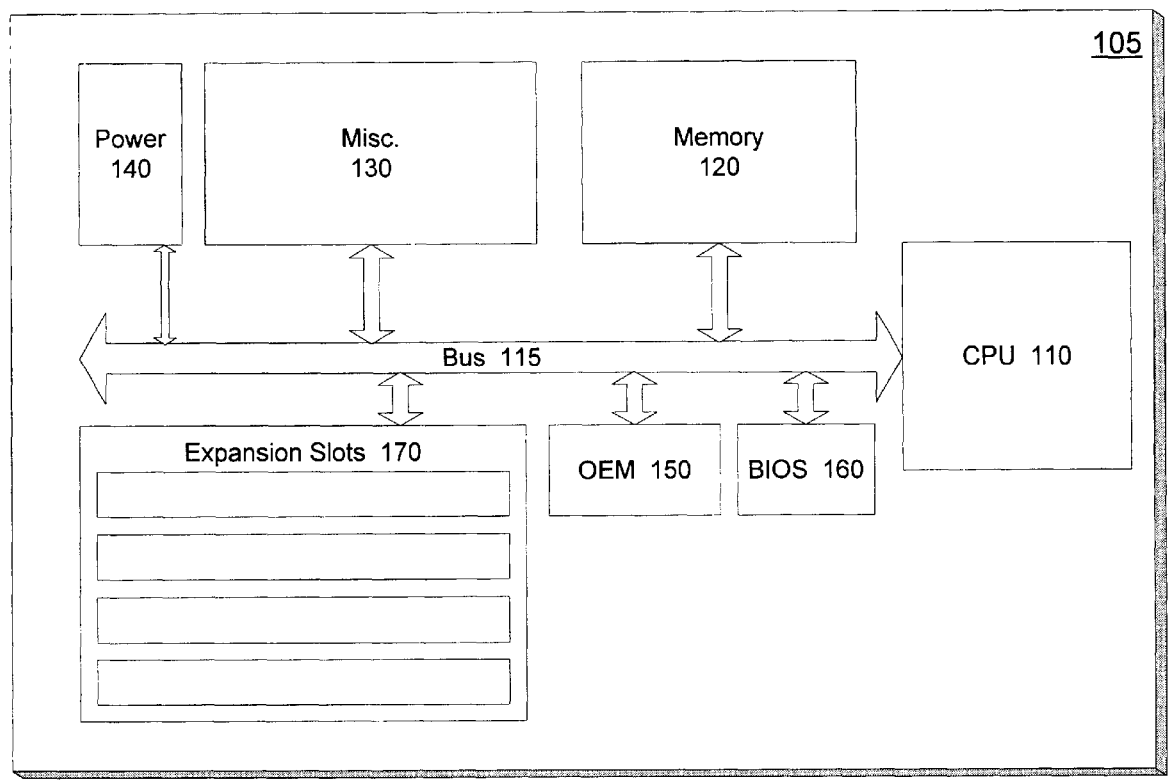
FIG. 1 shows a block diagram of a system board of a computer system which includes an OEM ID in accordance with an embodiment of the invention.

Referring to FIG. 1, a system board 105 of an exemplary computer system 100 is shown. System board 105 includes central processor unit (CPU) 110, memory system 120, miscellaneous circuits 130, power unit 140, BIOS 160, expansion slots 170 and OEM circuit 150. Miscellaneous circuits 130 may include, but are not limited to, various interrupt logic, device drivers, clock and timer logic, and bus control and arbitration logic. The elements of system board 105 may be connected by a variety of busses according to various bus architecture specifications. Alternatively, the elements of system board 105 may be connected by direct lines between the elements. The bus and direct line connections are represented by bus 115.

FIG. 1 is illustrative of a system board in a computer system incorporating an OEM ID. System board 105 may be incorporated in a variety of computer systems, which may, in turn, incorporate a variety of peripheral components. Alternative system configurations will inevitably add to, substitute for, or eliminate from the system board components shown in FIG. 1. Suitable variations of computer systems generally, in accordance with the present invention, will be apparent to those skilled in the art. Additionally, miscellaneous circuits 130 are well known in the art, and any combination of miscellaneous circuits 130 or inventive additions to miscellaneous circuits 130 may be used in accordance with the present invention. Also, the connections between the elements of system board 105 are well known in the art, and any combination of known or inventive connections may be used in accordance with the present invention.

Figure 2:
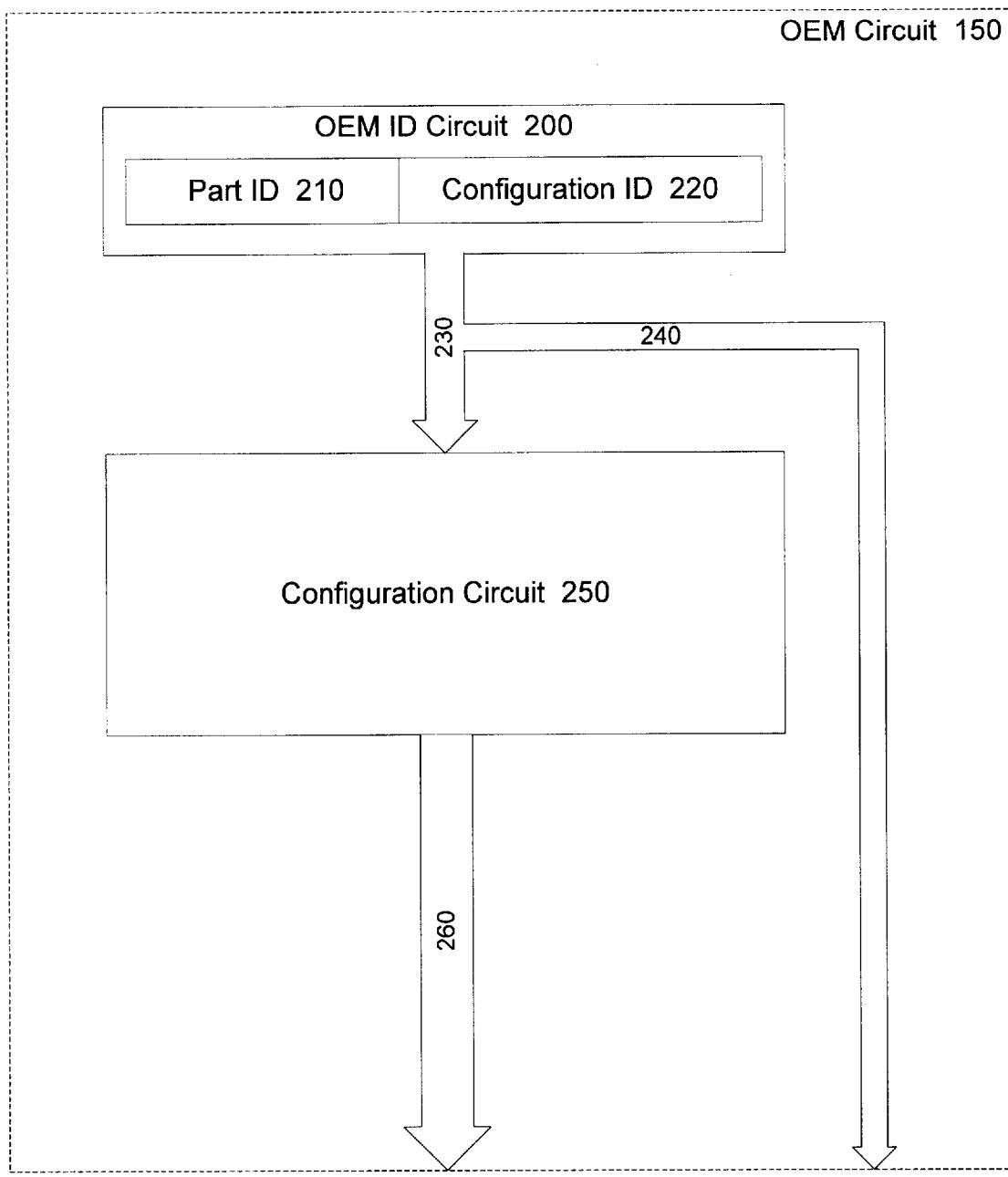
FIG. 2 shows a block diagram of the FIG. 1 OEM ID circuit in accordance with an embodiment of the invention.

Referring to FIG. 2, an exemplary OEM circuit 150 is shown. OEM circuit 150 includes OEM ID circuit 200 and configuration circuit 250. OEM ID circuit 200 includes part ID field 210 for storing a part ID and Configuration ID field 220 for storing a configuration ID. The configuration ID identifies the configuration required by the OEM. Each OEM may have multiple configurations and therefore multiple configuration IDs. In the preferred embodiment, the OEM ID includes the Part ID and the configuration ID. In other embodiments, the part ID may be replaced with another field or may be removed altogether. OEM ID circuit 200 provides the OEM ID to configuration logic 250 via bus 230 and to BIOS 160 via bus 240.

In the preferred embodiment of OEM ID circuit 200, the part ID and configuration ID are stored in ROM banks on an OEM ID chip. One integrated chip that may serve as an OEM ID chip is the DS2502 chip (available from Dallas Semiconductor, Dallas, Tex.). Part ID field 210 stores a unique identification number which can be used to identify the part (and, e.g., the particular personal computer system in which the part is placed). Configuration ID field 220 stores a one-time writable identification number uniquely identifying each configuration required by the manufacturer (OEM) of computer system 100.

The OEM ID is typically written to ROM prior to installation of the OEM ID chip on system board 105, but in circuit programming is also in accordance with the present invention. Although a DS2502 chip is used in the preferred embodiment, any circuit in which an OEM ID can be stored may be used in accordance with the present invention. Also, although part ID field 210 and Configuration ID field 220 are ROM banks in the preferred embodiment, part ID field 210 and Configuration ID field 220 may be implemented through other means such as EEPROMs or flash memory. Additionally, although in the preferred embodiment OEM ID circuit 200 provides the OEM ID to configuration logic 250 and BIOS 160, OEM ID circuit 200 may provide the OEM ID to other circuits or parts of the OEM ID to any circuit, in accordance with the present invention.

Figure 3:
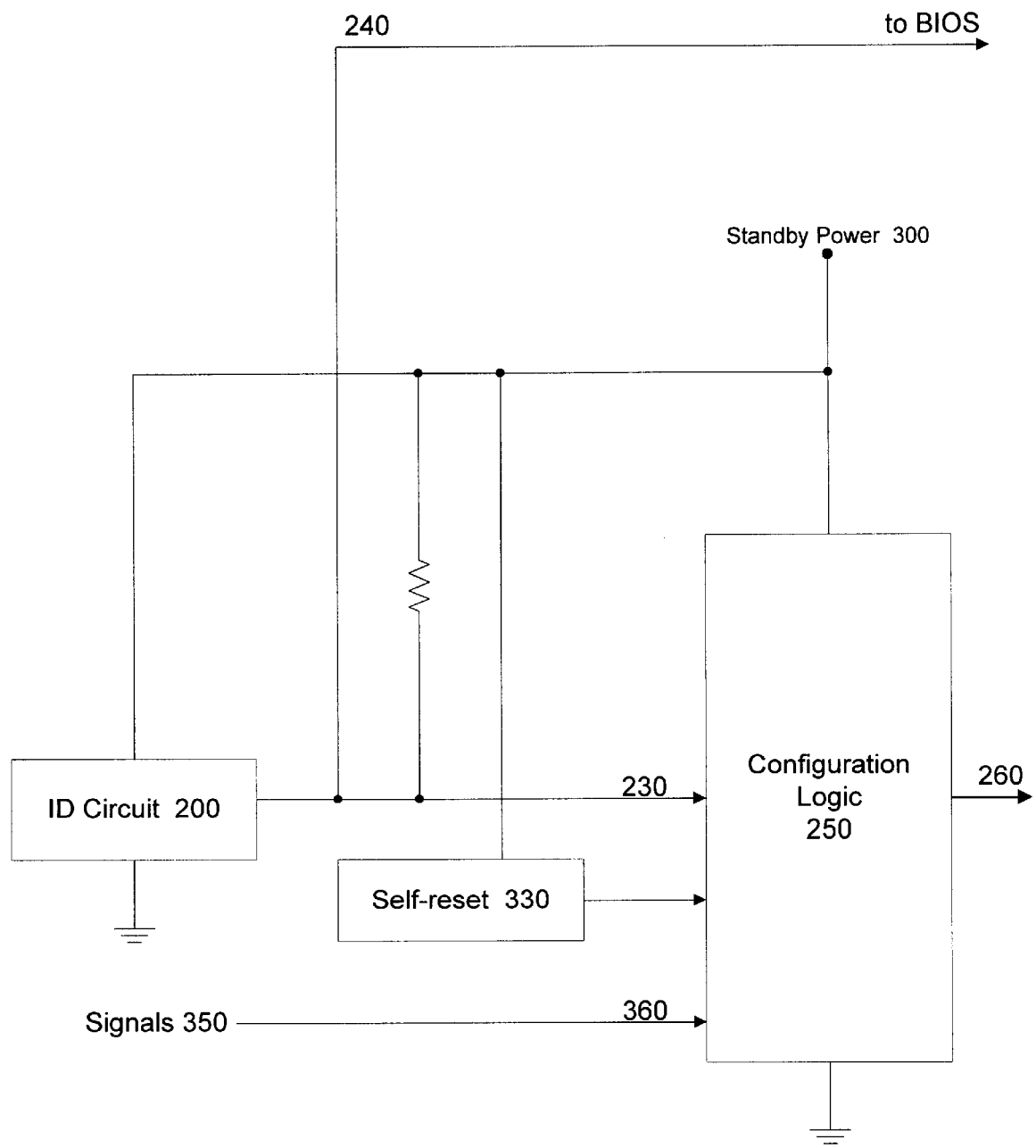
FIG. 3 shows a block diagram of the FIG. 1 OEM ID circuit in accordance with an embodiment of the invention.

Referring to FIG. 3, exemplary OEM circuit 150 is shown in more detail. OEM ID circuit 200 provides the OEM ID to configuration logic 250 via bus 230 and to BIOS 160 via bus 240. Signals 350 are input to configuration logic 250 via bus 360 for configuration. Also, self-reset 330 is coupled to configuration logic 250. OEM ID circuit 200, self-reset 330 and configuration logic 250 are powered by standby power 300. Configured signals are provided to the rest of computer system 100 via bus 260.

As shown, OEM circuit 150 operates using standby 5 volt (+5V) power. The standby power of computer system 100 is provided by power supply 140. Power supply 140 has a primary system power output and a second, low current, low standby power output. When computer system 100 is off, but power supply 140 is plugged in, standby power is applied to certain circuits. These circuits, running on standby power, can perform functions such as remotely turning on computer system 100. These circuits are usually related to the power supply. If the system is a portable computer that is not plugged in, or if standby power from the power supply is not provided in computer system 100, a battery can be used to provide standby power to the circuits requiring it. This battery provides the standby power while the system is off, and is recharged when the system is on.

Because OEM ID circuit 150 operates using standby power, the OEM ID is accessible prior to system power-up. Thus, OEM ID circuit 200 provides identification information so that configuration logic 250 can configure the signals of computer system 100 before computer system 100 has powered up.

Configuration logic 250 is activated shortly after a self-reset when the standby power is applied. Self-reset circuit 330 provides a reset configuration logic 250. In the preferred embodiment, configuration logic 250 includes certain latches. Latches often power-up to predetermined conditions. For example, most latches power-up to "reset." Some latches power-up to "set." Others have no defined power-up value. Self-reset circuit 330 is used to force the latches of configuration logic 250 to a known state upon application of the standby power. The latching of configured signals is well known in the art.

As mentioned, in the preferred embodiment, the OEM ID is provided to BIOS 160 via bus 240. BIOS 160 prints the proper BIOS message to a video monitor attached to computer system 100. The BIOS video message is determined by the OEM. Therefore, the value of the OEM ID ensures the proper BIOS message is output to the video monitor. An example of a BIOS video message is a message identifying the system to the user. Such messages are common in the art. In the preferred embodiment, portXX provides an interface for the BIOS to read the OEM ID. PortXX provides I/O decodes for BIOS to read general purpose I/O pins over an X bus in computer system 100.

Configuration logic 250 receives the OEM ID and system signals 350 to be configured, decodes the OEM ID, and configures the output registers of system board 100 accordingly. Various implementations of decoding logic may be used and are well known in the art. Configuration logic 250 generates configuration signals as a result of decoding the OEM ID. If the OEM ID indicates that a first type of hardware (used by a first OEM) is present, a first set of configured signals are generated. If the OEM ID indicates a second type of hardware is present, a second set of configured signals are generated. If the OEM ID indicates a subsequent type of hardware is present, a subsequent set of configured signals are generated. For example, if a reverse polarity signals is the only nonstandard requirement of a first OEM, then the signal is reversed by configuration logic 250 upon detection of the presence of the particular type of OEM hardware.

Configuration logic 250 can take many forms. In the preferred embodiment, configuration logic 250 is a programmable logic array (PLA). Configuration logic 250 may include various forms of low power state machines or programmable array logic.

In one embodiment, a signal requiring configuration is the "power supply on" signal (PSON) which turns on the power supply of computer system 100. Many OEMs require the PSON signal to have a positive polarity (active high). Other OEMs require the PSON signal to have a negative polarity (active low). The PSON signal is provided as one of signals 350 to configuration logic 250. Configuration logic 250 identifies the relevant OEM configuration from the OEM ID, and configures the PSON signal to the polarity required by the corresponding OEM configuration.

Figure 4:
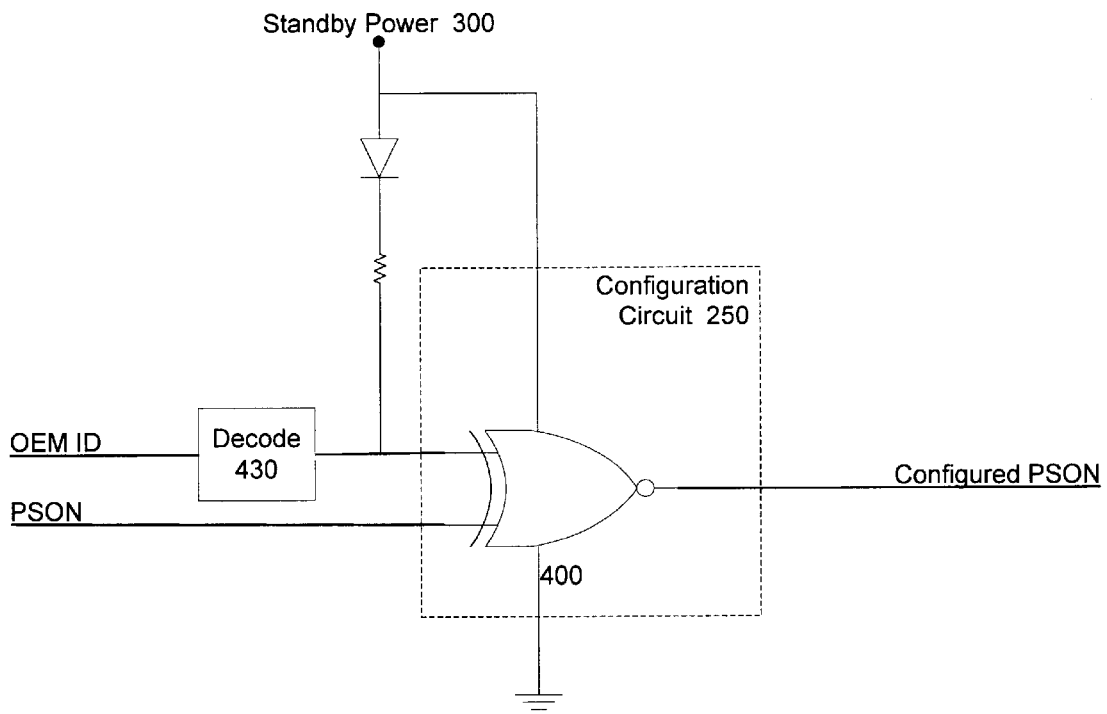
FIG. 4 shows an exemplary embodiment of a configuration circuit in accordance with the invention.

For example, referring to FIG. 4, configuration logic 250 includes decoder 430 and XNOR gate 400. Decoder receives the OEM ID at an input terminal and provides a control signal to XNOR gate 400 via an output terminal. XNOR gate 400 receives the unconfigured PSON signal and the control signal and outputs a configured PSON signal. Decoder 430 and XNOR gate 400 are powered by standby power.

In operation, decoder 430 receives and decodes the OEM ID to provide an OEM PSON detect signal to XNOR gate 400. XNOR gate 400, or an equivalent thereof, receives the unconfigured PSON signal and the OEM PSON detect signal indicating which type of polarity is required by the OEM identified by the OEM ID. XNOR gate 400 sets the proper polarity of the PSON signal. For example, if a positive polarity is required by the OEM identified by the OEM ID, the OEM PSON detect signal is driven high by configuration logic 250 so that the configure PSON output of XNOR gate 400 equals the unconfigured PSON input. If a negative polarity is required by the OEM identified by the OEM ID, the OEM PSON detect signal is driven low by configuration logic 250 so that the configured PSON output of XNOR gate 400 is inverted from the unconfigured PSON input.

Thus, in one embodiment, configuration logic 250 acts as a simple inverter for certain signals when an OEM requiring an inverse polarity for those signals is using system board 105. Any OEM may use system board 105 without the need to change its value-added hardware and software due to differences in signal polarity requirements.

Figure 5:
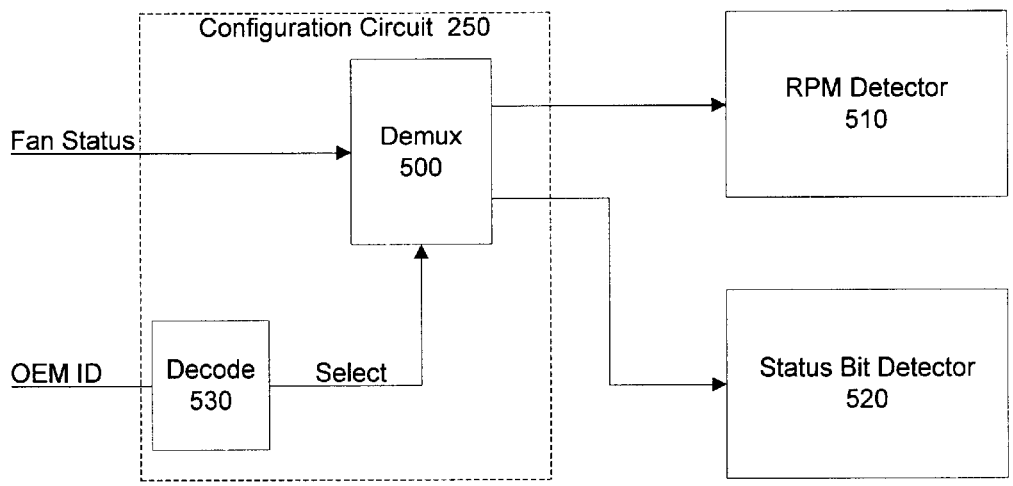
FIG. 5 shows an exemplary embodiment of a configuration circuit and OEM implemented circuits in accordance with the invention.

In another embodiment, referring to FIG. 5, configuration logic 250 includes demux 500, RPM detector 510, status bit detector 520 and decoder 530. Demux 500 receives a fan status signal from a fan in computer system 100. Demux 500 further receives a select signal from decoder 530 in configuration logic 250. Decoder 530 receives and decodes the OEM ID to provide the select signal. Demux 500 provides the fan status signal to RPM detector 510 or status bit detector 520 depending on the value of the select signal from decoder 530. As mentioned, configuration logic 250 is powered by system standby power.

Many OEMs monitor fan status to check for a binary active/fail condition. Thus, these OEMs use fans that provide a binary fan status signal indicating whether the fan is operating or not. Other OEMs monitor fan degradation over time by observing fan revolutions per minute (RPM) for predictive failure calculations. These other OEMs use fans that provide an RPM fan status signal. For example, a fan may be rotating at an extremely low rate. An active/fail status indicator may indicate active even though the fan is not rotating quickly enough to cool computer system 100. A fan RPM status signal provides the necessary information for some OEMs to more accurately indicate fan failure.

In the embodiment of FIG. 5, configuration logic 250 receives the OEM ID to configure fan status information provided by a fan in computer system 100. A fan status signal is provided as an input signal to configuration logic 250. Configuration logic 250 identifies the relevant OEM from the OEM ID, and configures the fan status as required by the identified OEM. In the preferred embodiment, configuration logic directs the fan status signal to a signal line connected to the proper fan status detection device provided by the identified OEM.

Specifically, configuration logic 250 reads the OEM ID and uses it to determine if the OEM uses RPM detection. If the OEM uses RPM detection, decoder 530 forces the select line of demux 500 to a first value to direct the fan status signal to RPM detection device 510. If the OEM does not use RPM detection, decoder 530 forces the select line of demux 500 to a second value to direct the fan status signal to status bit detection device 520. If other means of fan monitoring are employed by various OEMs, the width of the demux may be increased or alternative circuits may be provided.

Thus, configuration logic 250 acts as a signal router for certain signals when an OEM part is installed that requires a particular signal from system board 105. Any OEM may use system board 105 without the need to change its value-added hardware and software.

In another embodiment, configuration logic 250 includes configuration drivers for side band signals such as those of the physical bus referred by the "I2C" brand bus ("I2C" is a trademark of Phillips). The I2C physical bus is a physical bus used in many systems. I2C controllers are used for low performance I/O (e.g., observing system temperatures, voltages, fans, etc.). Most OEMs use a three pin wire (clock, data and ground) to the header or connector. Some OEMs use a different number of wires for clock, data, ground and additional signals. The same I2C bus is used for the same controller, but different headers are used. Instead of using another logic circuit to route the signals to the proper header, configuration logic 250 may direct the signals to the proper header depending on the OEM ID.

While the invention has been described with reference to various embodiments, it will be understood that these embodiments are illustrative and that the scope of the invention is not limited to them. Many variations, modifications, additions, and improvements of the embodiments described are possible. Those skilled in the art will recognize that boundaries between logic blocks are merely illustrative and that alternative embodiments may merge logic blocks or impose an alternative decomposition of functionality for OEM identification logic. For example, configuration logic 250 could be represented as multiple configuration logic blocks, each configuration logic block configuring a different signal or group of signals. Moreover, alternative embodiments may combine multiple instances of a particular component. For example, individual instances of selection logic could be combined or implemented as a single block if the needs of certain OEMs coincide. Alternative embodiments may also provide different methods of configuration of the same signals. Furthermore, the OEM identification described herein is merely illustrative and a variety of additional and/or alternative identification means may be analogously provided in accordance with the present invention. These and other variations, modifications, additions, and improvements may fall within the scope of the invention as defined in the claims which follow.

What is claimed is:

1. A configurable hardware for coupling to at least one of a plurality of hardware, each of the plurality of hardware having a corresponding original equipment manufacturer (OEM) identifier (ID) of a plurality of OEM IDs, and for configuring a system signal in response to an OEM ID, the configurable hardware comprising:

a memory for storing an OEM ID of the plurality of OEM IDs, the OEM ID identifying an OEM configuration of the at least one of the plurality of hardware; and a configuration circuit having a first input coupled to the memory for receiving an OEM ID, a second input for coupling to a system signal, and an output for providing configured signals in response to the OEM ID provided by the memory.

2. The configurable hardware of claim 1, wherein the memory is powered by standby power.

3. The configurable hardware of claim 1, wherein the memory is powered by standby power; and the configuration circuit includes configuration logic, the configuration logic being coupled to the memory, the configuration logic configuring the system signal according to the stored OEM ID, the configuration logic being powered by the standby power.

4. The configurable hardware of claim 3, wherein the configuration logic is a programmable logic array.

5. The configurable hardware of claim 3, wherein the configuration logic comprises:

a decoder for decoding the stored OEM ID and generating a configuration signal according to the stored OEM ID; and inverter logic receiving the system signal and the configuration signal, the inverter logic inverting the system signal when the configuration signal has a first value, the inverter logic not inverting the system signal when the configuration signal has a second value.

6. The configurable hardware of claim 3, wherein the configuration logic comprises:

a decoder for decoding the stored OEM ID and generating a configuration signal according to the stored OEM ID; and select logic receiving the system signal and the configuration signal, the select logic providing the system signal to a first circuit when the configuration signal has a first value, the select logic providing the system signal to a second circuit when the configuration signal has a second value.

7. The configurable hardware of claim 3, wherein the configuration logic comprises:

a decoder for decoding the stored OEM ID and generating a configuration signal according to the stored OEM ID; and conversion logic receiving the system signal and the configuration signal, the conversion logic converting the system signal when the configuration signal has a first value.

8. The configurable hardware of claim 3 wherein the memory provides the stored OEM ID to a function execution circuit, the function execution circuit executing a function according to the stored OEM ID; and the configuration logic is powered by standby power.

9. The configurable hardware of claim 5, wherein the inverter logic is an XNOR gate, the XNOR gate inverting the system signal when the configuration signal is low, the inverter logic not inverting the system signal when the configuration signal is high.

10. The configurable hardware of claim 8 wherein the function execution circuit comprises a BIOS circuit, the BIOS circuit providing a signal to an I/O unit according to the stored OEM ID.

11. A computer system comprising:

a first hardware having an original equipment manufacturer (OEM) hardware configuration, the OEM hardware configuration being one of a plurality of OEM hardware configurations; and a second hardware, the second hardware coupled to the first hardware, the second hardware including a memory for storing an OEM ID identifying the OEM hardware configuration of the first hardware; and a configuration circuit, the configuration circuit coupled to receive the OEM identifier (ID) identifying the OEM hardware configuration, the configuration circuit decoding the OEM ID responsive to receiving the OEM ID to provide at least one configuration signal to configure computer system signals for use by the first hardware.

12. The computer system of claim 11, wherein the memory is powered by standby power.

13. The computer system of claim 11 further comprising:

a standby power supply coupled to the second hardware, the standby power supply providing power to the memory and the configuration circuit; and a configuration circuit coupled to the memory, the configuration circuit receiving the computer system signals and the OEM ID, the configuration circuit configuring the computer system signals according to the OEM ID.

14. The computer system of claim 11, wherein the configuration circuit comprises:

a decoder for decoding the OEM ID and generating the configuration signal according to the OEM ID; and inverter logic receiving a first signal and the configuration signal, the inverter logic inverting the first signal when the configuration signal has a first value, the inverter logic not inverting the first signal when the configuration signal has a second value.

15. The computer system of claim 11 further comprising:

function execution logic coupled to the memory, the function execution logic executing a function according to the OEM ID, the memory and configuration logic powered by standby power.

16. The computer system of claim 11 further comprising:

BIOS logic coupled to the memory, the BIOS logic performing a function according to the OEM ID, the configuration logic powered by standby power.

17. The computer system of claim 13, wherein the configuration circuit is a programmable logic array.

18. The computer system of claim 13, wherein the configuration circuit comprises:

a decoder for decoding the OEM ID and generating a configuration signal according to the OEM ID; and select logic receiving a first signal and the configuration signal, the select logic providing the first signal to a first circuit when the configuration signal has a first value.

19. The computer system of claim 16 further comprising:

BIOS logic coupled to the memory, the BIOS logic providing a signal to an I/O unit according to the OEM ID, the configuration logic powered by standby power.

20. A method for providing configurable hardware in a computer system, the method comprising:

providing a memory, the memory powered by standby power, the memory storing an original equipment manufacturer (OEM) identifier (ID) identifying an OEM configuration;

providing configuration logic, the configuration logic powered by standby power, the configuration logic coupled to receive the OEM ID and signals of the computer system, the configuration logic configuring the signals of the computer system in a manner determined by the OEM ID responsive to receiving the OEM ID and the signals.

21. The method of claim 20 wherein the step of providing a memory comprises:

providing a ROM memory; and programming the ROM memory with the OEM ID identifying the OEM configuration.

22. An apparatus for configuring first signals for compatibility with each of a plurality of original equipment manufacturer (OEM) hardware, the apparatus comprising:

a OEM identifier (ID) memory for storing an OEM ID for identifying one of the plurality of OEM hardware; and configuration circuitry coupled to receive the OEM ID, the configuration circuitry being coupled to receive the first signals, the first signals being unconfigured for compatibility with any of the plurality of OEM hardware, the configuration circuitry being coupled to configure the first signals in a manner determined by the OEM ID to provide second signals configured for compatibility with one of the plurality of OEM hardware.

23. The apparatus of claim 22, wherein the apparatus further comprises:

a configurable system board, the configurable system board being alternatively configurable for compatibility with each of the plurality of OEM hardware depending on the OEM ID stored in the OEM ID memory, the configurable system board including:

the first signals;

the OEM ID memory;

the configuration circuitry; and the second signals.

24. The apparatus of claim 23, wherein the OEM ID memory is a read only memory having the OEM ID stored therein; and the configurable system board is compatible with the one of the plurality of OEM hardware identified by the OEM ID stored in the OEM ID memory.

25. The apparatus of claim 24, wherein the apparatus further comprises:

a computer system, the computer system including the configurable system board; and the one of the plurality of OEM hardware identified by the OEM ID, the one of the plurality of OEM hardware identified by the OEM ID being coupled to the configurable system board.

26. A method for configuring signals in a computer system for compatibility with each of a plurality of original equipment manufacturer (OEM) hardware, the method comprising:

generating first signals in the computer system responsive to power being applied to the computer system, the first signals being unconfigured for compatibility with any of the plurality of OEM hardware;

reading an OEM identifier (ID) from a memory by configuration circuitry, the OEM ID identifying at least one of the plurality of OEM hardware installed in the computer system; and configuring the first signals by the configuration circuitry in a manner determined by the OEM ID to provide second signals configured for compatibility with the at least one of the plurality of OEM hardware installed in the computer system.

27. In a computer system, an apparatus for configuring system signals in response to information that specifies the system configuration, the apparatus comprising:

an original equipment manufacturer (OEM) identifier (ID) circuit for storing an OEM ID that specifies the system configuration;

a decoder, having an input coupled to the OEM ID circuit, for decoding an OEM ID and providing a configuration signal at an output; and a configuration signal generator (400, 500) having a first input for coupling to a system signal and a second input coupled to the output of the decoder, the configuration signal generator operable to provide a configured signal at an output, where the configured signal is provided in response to the system signal and the configuration signal.

28. An apparatus as defined in claim 27, wherein the apparatus is coupled to a source of standby power so that the OEM ID and configured signal are available prior to the computer system having been powered up.

29. An apparatus as defined in claim 27, wherein the output of the OEM ID circuit is coupled to a bus for coupling a configured signal to the system ROM BIOS.

* * * * *